United States Patent [19]

Agiman

[11] Patent Number: 5,631,528
[45] Date of Patent: May 20, 1997

[54] ELIMINATION OF MOTOR NEGATIVE VOLTAGES DURING MOTOR BRAKE

[75] Inventor: Dan Agiman, Irvine, Calif.

[73] Assignee: Linfinity Microelectronics, Garden Grove, Calif.

[21] Appl. No.: 434,764

[22] Filed: May 4, 1995

[51] Int. Cl.$^6$ .................................................... H02P 3/12
[52] U.S. Cl. ...................... 318/293; 318/379; 318/503; 318/507; 388/907.2
[58] Field of Search .................................. 318/287, 291, 318/293, 294, 295, 375, 376, 379, 380, 138, 244, 245, 246, 254, 439, 492, 503, 506, 507; 388/907.2

[56] References Cited

U.S. PATENT DOCUMENTS

| | | | |
|---|---|---|---|
| 3,708,737 | 1/1973 | Johnson | 318/636 |
| 3,748,560 | 7/1973 | Sawa et al. | 318/430 |
| 4,477,751 | 10/1984 | Kanayama | 318/280 |
| 4,527,103 | 7/1985 | Kade | 318/293 |
| 4,581,565 | 4/1986 | Van Pelt et al. | 318/294 |
| 5,023,527 | 6/1991 | Erdman et al. | 318/254 |
| 5,132,602 | 7/1992 | Jorgensen et al. | 318/608 |
| 5,231,338 | 7/1993 | Bulgarelli et al. | 318/254 |
| 5,350,985 | 9/1994 | Konrad | 318/370 |

*Primary Examiner*—Bentsu Ro
*Attorney, Agent, or Firm*—Loeb & Loeb LLP

[57] ABSTRACT

A method for sensing motor commutation pulses during motor braking without creating negative voltages, which some junction isolated technologies substantially cannot tolerate. For instance, a commutation pulse sensing circuit containing junction isolated technology may only be able to detect commutation pulses intermittently. An H-bridge motor drive configuration is used to drive and brake a motor. High side clamp diodes are coupled between the motor terminals and a high potential source for high side braking of the motor. As an alternative to high side clamp diodes, any other suitable device may be used, including operating the pair of transistors in the upper portion of the H-bridge in an inverse mode. A commutation pulse sensing circuit is coupled to a terminal of the motor. The use of the high side brake clamp diodes avoids generating negative voltages at the motor terminals.

16 Claims, 3 Drawing Sheets

ELIMINATION OF MOTOR NEGATIVE VOLTAGES DURING MOTOR BRAKE

BACKGROUND OF THE INVENTION

1. Field of the Invention

This invention relates generally to methods and apparatuses for preventing negative voltages, and in particular embodiments, to a method and apparatus for eliminating motor negative voltages during motor braking for the purpose of sensing motor commutation pulses.

2. Description of Related Art

Commutation pulses are generated, for example, in direct current permanent magnet motors. As the motor rotates, the current through its windings is periodically interrupted due to the action of the motor brushes. This produces steep pulses or spikes in the motor current, called commutation pulses. By detecting and counting motor commutation pulses, it is possible to track the position of a motor.

Typically motors are driven and braked with H-bridge circuits. Negative voltages arise during motor braking, when braking is accomplished using a standard H-bridge motor drive circuit. While a motor is braking, sensing of motor commutation pulses can be difficult, because negative voltages substantially cannot be tolerated with some junction isolated technologies. For instance, use of some junction isolated technologies as part of a commutation pulse sensing circuit results in the sensing circuit intermittently detecting commutation pulses during braking.

A standard H-bridge circuit is illustrated in FIGS. 1A and 1B. In FIG. 1A, a first 10, a second 12, a third 14, and a fourth 16 bipolar junction transistors are shown coupled to a motor 18. A collector 20 of the first transistor 10 and a collector 22 of the second transistor 12 are each coupled to a high potential terminal 24, at which, for example a positive voltage is applied. An emitter 26 of the third transistor 14 and an emitter 28 of the fourth transistor 16 are coupled to a low potential terminal 30, e.g. ground. A first terminal 32 of the motor 18 is coupled to an emitter 34 of the first transistor 10 and to a collector 36 of the third transistor 14. A second terminal 38 of the motor 18 is coupled to an emitter 40 of the second transistor 12 and to a collector 42 of the fourth transistor 16. A first parasitic diode 44 is coupled effectively between the collector 36 and the emitter 26 of the third transistor 14. Similarly, a second parasitic diode 46 is coupled effectively between the collector 42 and the emitter 28 of the fourth transistor 16.

The first transistor 10 has a base 48, the second transistor 12 has a base 50, the third transistor 14 has a base 52, and the fourth transistor 16 has a base 54. These bases are controlled by control signals (not shown).

To operate the H-bridge circuit of FIG. 1A in a drive mode (in which the motor behaves as a load), the base 48, that is the base-emitter junction 48, 34, of the first transistor 10 and the base 54, that is the base-emitter junction 54, 28, of the fourth transistor 16 are forward biased, such that current can flow from their respective collectors to their respective emitters. The second transistor 12 and the third transistor 14 have their bases 50 and 52, respectively, biased such that these transistors do not conduct current. In this drive mode, as illustrated in FIG. 1A, a motor current 55 flows from the high potential terminal 24 through the first transistor 10, through the motor 18, and through the fourth transistor 16 to the low potential terminal 30.

In order to brake the motor 18, typically a low side brake mode is used, as shown in FIG. 1B. As part of that brake mode, the base 48 of the first transistor 10 is no longer forward biased, thus decoupling the first terminal 32 of the motor 18 from the high potential terminal 24. In addition, the base 52 of the third transistor 14 is forward biased to couple the first terminal 32 to the low potential terminal 30, through the third transistor 14. The control signals applied at the base 50 of the second transistor 12 and applied at the base 54 of the fourth transistor 16 remain unchanged relative to the drive mode.

As a result of these control signals, the motor 18 acts as a generator and the motor current 55 reverses direction and flows in the direction of the arrow illustrated in FIG. 1B. Due to the direction of the current 55 flow (counterclockwise in FIG. 1B), a negative voltage is generated at a terminal 56. That negative voltage at terminal 56 is caused by the voltage drop across the second parasitic diode 46.

Terminal 56 is a convenient place at which to sense motor commutation pulses. However, as mentioned above, for some junction isolated technologies which are used in commutation pulse sensing circuits, there exists the problem of substantial intolerance to negative voltages. Thus, there is a need for eliminating negative voltages, such that a designer is not prevented from using some junction isolated technologies.

SUMMARY OF THE DISCLOSURE

In accordance with embodiments of the present invention, an apparatus and method eliminate motor negative voltages during braking by selectively shunting the motor terminals to high and low potential terminals.

According to one embodiment of the invention, a method for elimination of motor negative voltages during braking of a motor, having a first and a second terminals, uses a high and a low potential terminals. In a drive mode, current is driven from the first terminal to the second terminal of the motor. The method comprises the step of coupling the second terminal of the motor to the high potential terminal. Additionally, a diode is coupled from the first terminal of the motor to the high potential terminal, the diode being connected such that the diode's forward current is from the first terminal of the motor to the high potential terminal.

In another embodiment, the step of coupling the second terminal of the motor to the high potential terminal comprises the step of coupling a first switch between the second terminal of the motor and the high potential terminal. Moreover, the first switch is switched into a first state, such that a current can flow between the second terminal of the motor and the high potential terminal, wherein that step comprises switching a first switch in an H-bridge circuit. Furthermore, a second switch in an H-bridge circuit is coupled between the second terminal of the motor and the low potential terminal. The second switch is switched into a second state for decoupling the second terminal of the motor from the low potential terminal. A third switch in an H-bridge circuit is coupled between the first terminal of the motor and the low potential terminal. The third switch is switched into a second state for decoupling the first terminal of the motor from the low potential terminal.

In another embodiment the method further comprises the step of coupling to the second terminal of the motor a junction isolated circuit that substantially cannot tolerate negative voltages.

The above discussed and many other features and attendant advantages of the present invention will become better understood by reference to the following detailed description, when considered in conjunction with the accompanying drawings.

DETAILED DESCRIPTION OF PREFERRED EMBODIMENTS

The following detailed description is the best presently contemplated mode of carrying out the invention. This description is not to be taken in a limiting sense, but is made merely for the purpose of illustrating general principles of embodiments of the invention. The scope of the invention is best defined by the appended claims. In the figures discussed below, the same or equivalent items shown in the figures are identified by the same reference numbers.

Figure 1A:
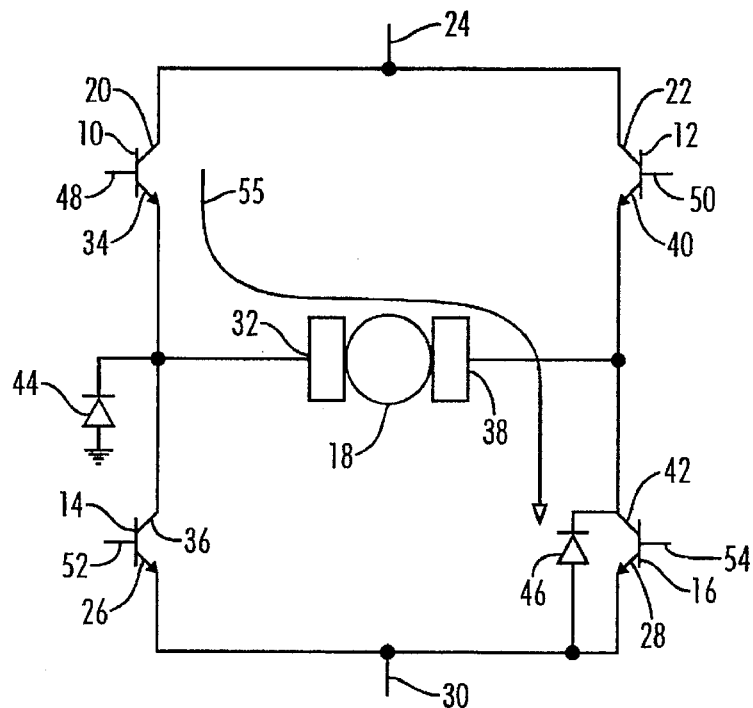
FIG. 1A shows a motor current, a motor, and an H-bridge motor drive configuration in a drive mode.
Figure 1B:
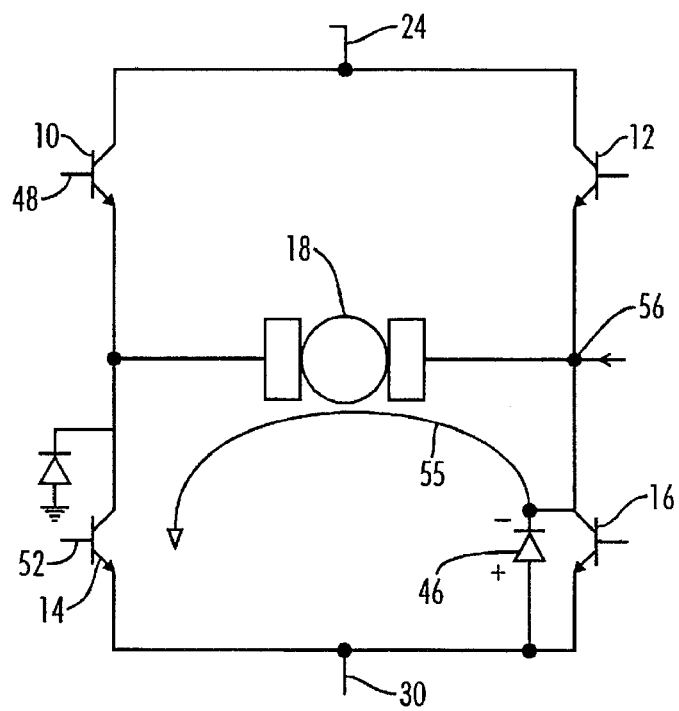
FIG. 1B shows the motor current for the motor and circuit of FIG. 1A in a low side brake mode.
Figure 2A:
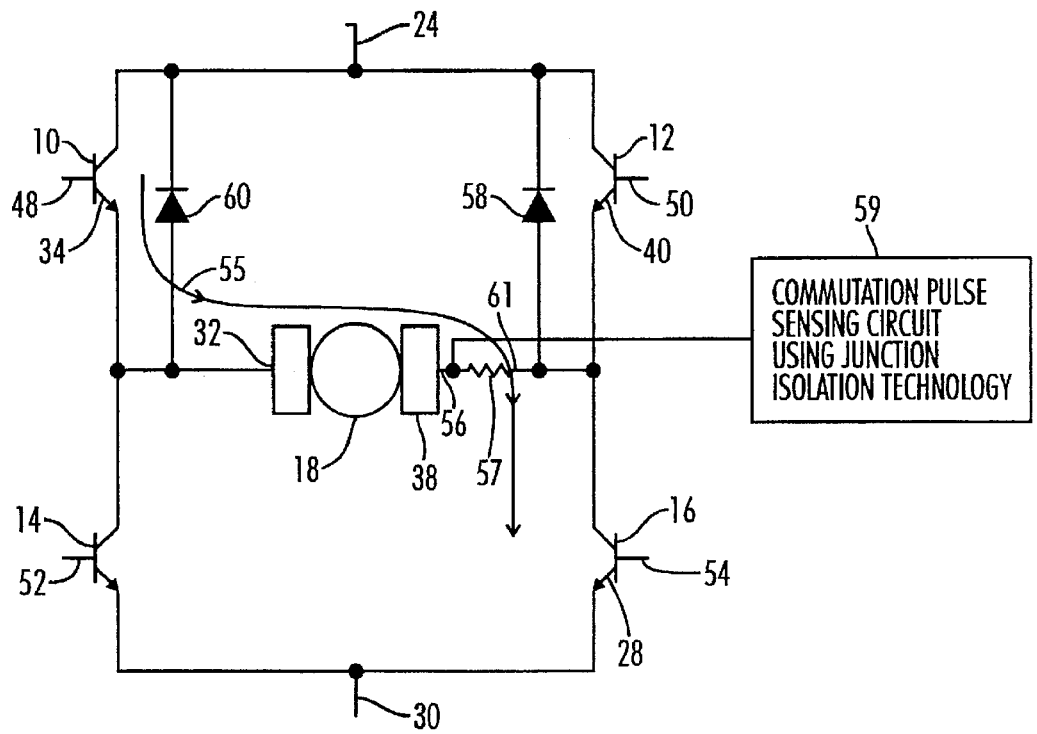
FIG. 2A shows an H-bridge motor drive circuit and method for a motor in a drive mode.
Figure 2B:
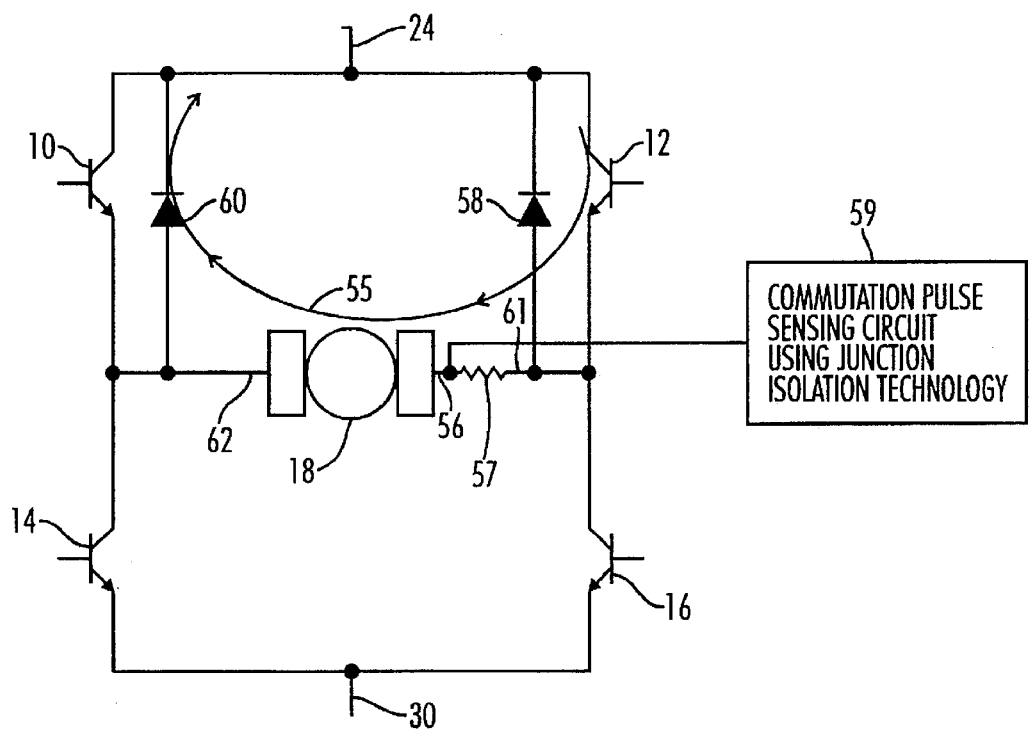
FIG. 2B shows the use of an H-bridge circuit of FIG. 2A, in a brake mode, according an embodiment of the present invention.

FIGS. 2A and 2B illustrate a typical H-bridge motor drive circuit with diodes for high side motor braking and for eliminating motor negative voltages during motor braking, in accordance with a preferred embodiment of the invention. In the illustrated embodiment, preferably a sensing resistor 57 is coupled between the second terminal 38 of motor 18 and the emitter 40 of the second transistor 12. The sensing resistor 57 has a terminal 61, which is coupled to the first high side clamp diode 58. The first high side clamp diode 58 is coupled such that its forward current is from the terminal 61 of the sensing resistor 57 to a high potential terminal 24. A second high side clamp diode 60 is coupled such that its forward current is from a first terminal 32 of the motor 18 to the high potential terminal 24, at which, for example, a positive voltage (not shown) is applied.

In the drive mode, as illustrated in FIG. 2A, a base 48, that is a base-emitter junction 48, 34, of a first transistor 10 and a base 54, that is a base-emitter junction 54, 28, of a fourth transistor 16 are forward biased, thus coupling the first terminal 32 of the motor to a high potential terminal 24, and coupling a second terminal 38 of the motor 18 to a low potential terminal 30, for example ground, respectively. A base 50 of the a transistor 12 and a base 52 of a third transistor 14 are biased, such that these transistors substantially do not conduct current. This decouples the second terminal 38 of the motor 18 from the high potential terminal 24 and the first terminal 32 of the motor 18 from the low potential terminal 30. Therefore, in the drive mode, a motor current 55 is driven, as illustrated in FIG. 2A, from the high potential terminal 24 through the first transistor 10, through the motor 18, from the first terminal 32 of the motor 18 to its second terminal 38, through the sensing resistor 57, and through the fourth transistor 16 to a low potential terminal 30, which is connected to the low potential, for example, ground.

To brake the motor 18, the base 50 of the second transistor 12 is forward biased. Also, the base 54 of the fourth transistor 16 is biased such that substantially no current flows through the fourth transistor 16. Thus, substantially no current flows through the portion of the H-bridge circuit comprised of the third and fourth transistors 14 and 16.

As a result, the motor current 55 in the brake mode reverses direction (with respect to the drive mode current 55 of FIG. 2A) and flows clockwise from the high potential terminal 24 through the second transistor 12, through the sensing resistor 57, through the motor 18, through the second high side clamp diode 60 to the high potential terminal 24. Therefore, no negative voltages are generated at a terminal 56. The potential at terminal 56 remains above that at the low potential terminal 30, because the substantially nonconducting fourth transistor 16 decouples the terminal 56 from the low potential terminal 30.

The first high side clamp diode 58 is coupled from the second terminal 38 of the motor 18 to the high potential terminal 24 to permit driving and braking the motor 18 in a direction opposite to that in which the motor 18 is driven in FIG. 2A. By forward biasing the base 50 of the second transistor 12 as well as the base 52 of the third transistor 14, the drive direction of motor 18 is reversed. The bases 48 and 54 of the first and fourth transistors 10 and 16, respectively, are biased so as to render these two transistors substantially nonconducting. Thus, in this drive mode, the motor current 55 flows from the high potential terminal 24 through the second transistor 12, through the sensing resistor 57, through the motor 18, through the third transistor 14 to the low potential terminal 30.

Braking the motor 18 in this drive mode comprises steps similar to those already discussed above for the other drive direction. The lower part (with respect to FIG. 2B) of the H-bridge circuit is decoupled from the motor 18 by rendering the third and fourth transistors 14 and 16 substantially nonconducting. The base 48 of the first transistor 10 is forward biased to render it conducting. In this manner, when in the brake mode, the motor current 55 flows in a counterclockwise instead of the clockwise direction of FIG. 2B. That is, the motor current 55 flows from the high potential terminal 24 through the first transistor 10 through the motor 18, through the sensing resistor 57, and then further through the first high side clamp diode 58 back to the high potential terminal 24. Again, the voltage at the terminal 56 is greater than that at the low potential terminal 30. Indeed, a voltage at the terminal 56 is higher than a voltage applied at the high potential terminal 24 by a voltage drop across the sensing resistor 57 and across the first high side clamp diode 58.

Since the above embodiment makes it possible to eliminate negative voltages at terminal 56, another embodiment could couple at terminal 56 a circuit (for example, circuit 59) that might benefit from an absence of negative voltages at terminal 56. (The benefit of avoiding negative voltages can also be had by coupling instead to a terminal 62 (see FIG. 2B) Preferably, there is a sensing resistor (not shown) coupled between terminal 62 and the second high side clamp diode 60, just as sensing resistor 57 is coupled between the terminal 56 and the first high side clamp diode 58.) One example of such a circuit is a junction isolated technology circuit. As mentioned above, one type of circuit that uses junction isolated technology is a circuit for sensing motor commutation pulses at the terminal 56, as shown at 59 in FIGS. 2A and 2B. A preferred embodiment of a sensing circuit is described in U.S. Pat. No. 5,514,977 and assigned to Silicon General, Inc. and is incorporated herein by reference. However, other suitable sensing circuits can be employed. Such a circuit may be substantially unable to correctly detect commutation pulses, if the voltage at the terminal 56 is negative. That is it may be able to detect commutation pulses during braking only intermittently.

Figure 3:
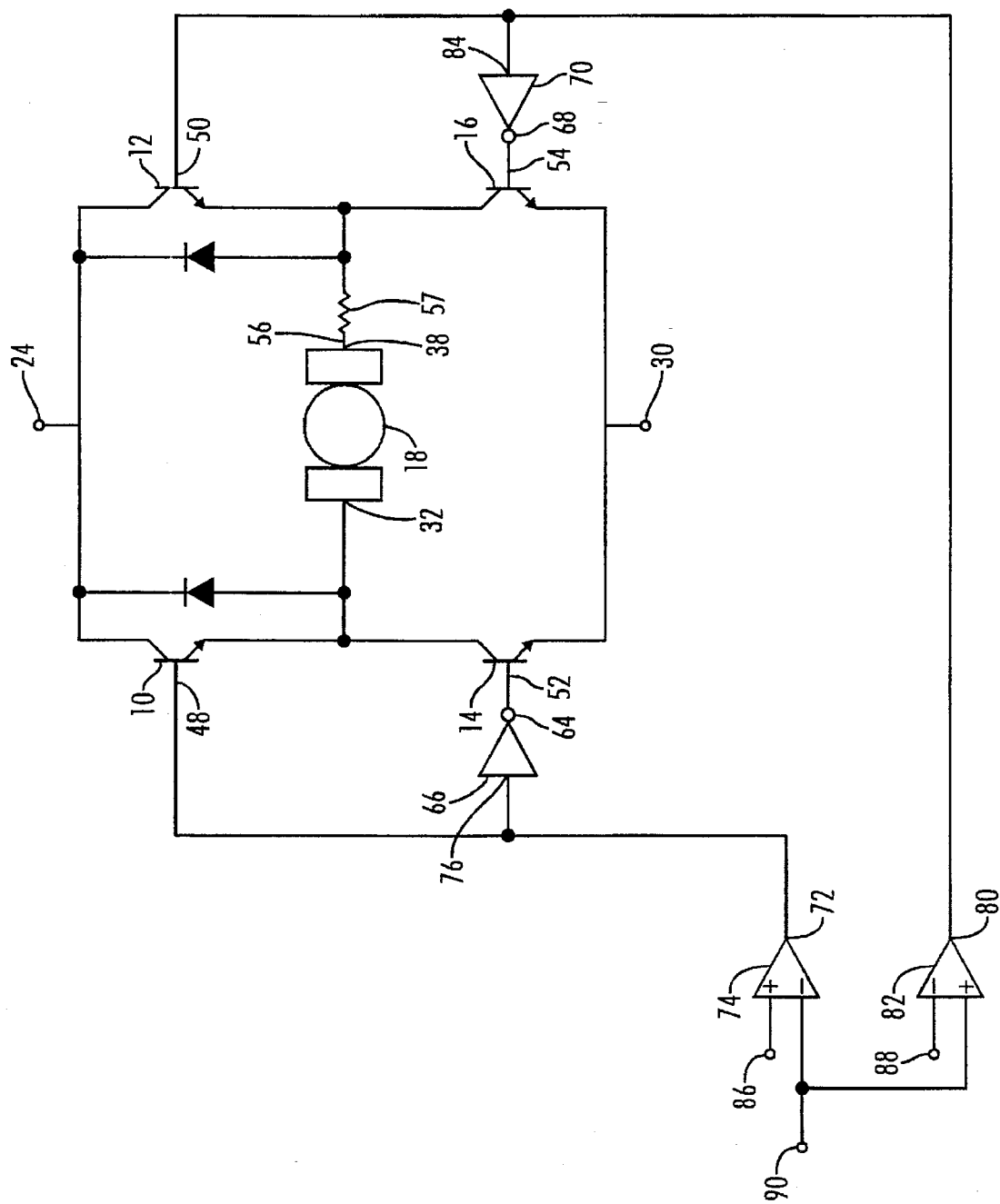
FIG. 3 shows a control circuit for controlling the biasing of the bases of the first, second, third, and fourth transistors 10, 12, 14, 16.

In another embodiment, the step of controlling the biasing of the bases of the first, second, third, and fourth transistors 10, 12, 14, 16 is accomplished by using a control circuit. FIG. 3 illustrates such a control circuit. In FIG. 3, an output 64 of a first inverter 66 is coupled to the base 52 of the third transistor 14. An output 68 of a second inverter 70 is coupled to the base 54 of the fourth transistor 16. An output 72 of a first comparator 74 is coupled to the base 48 of the first transistor 10, as well as to an input 76 of the first inverter 66. An output 80 of a second comparator 82 is coupled to the base 50 of the second transistor 12 as well as to an input 84 of the second inverter 70. Further, a first reference potential can be coupled to a positive terminal 86 of the first comparator 74. A second reference potential, lower than the first reference potential, can be coupled to a negative terminal 88 of the second comparator 82. A control signal can be applied at terminal 90 which is coupled to a negative terminal of the first comparator 74 and to a positive terminal of the second comparator 82.

In explaining the function of the control circuit of FIG. 3, it will be assumed, for illustrative purposes only, that the first reference potential applied at the positive terminal 86 of the first comparator 74 is 3.5 volts and the second reference potential at the negative terminal 88 of the second comparator 82 is 1.5 volts. The choice of these voltages is for the purpose of helping understand the circuit, but it is not a limitation of the circuit. To operate the motor 18 in the drive mode of FIG. 2A, a potential of less than 1.5 volts is applied at terminal 90. As a result, the voltage at the output 72 of the first comparator 74 will be high, thus causing the base 48 of the first transistor 10 to be forward biased. However, the third transistor 14 will be rendered substantially non-conducting, because the high output at the output 72 of the first comparator 74 is inverted by the first inverter 66 before it is applied to the base 52 of the third transistor 14. Moreover, due to the voltage at terminal 90 being less than 1.5 volts, the voltage at output 80 of the second comparator 82 will be low, thus rendering substantially non-conducting the second transistor 12. The low voltage at the output 80 of the second comparator 82 is inverted by the second inverter 70 to provide a high voltage at base 54 of the fourth transistor 16 resulting in the base 54 of the fourth transistor 16 being forward biased.

To high side brake the motor 18, as illustrated in FIG. 2B, the control voltage applied at terminal 90 is greater than 1.5 volts, but less than 3.5 volts. As a result, the voltage at output 72 of the first comparator 74 will remain high, thereby leaving the biased states of the first transistor 10 and the third transistor 14 unchanged. However, the voltage at output 80 of the second comparator 82 will change, from low to high, thereby forward biasing the base 50 of the second transistor 12. The high voltage at output 80 of the second comparator 82 is inverted by the second inverter 70 causing the fourth transistor 16 to become substantially non-conducting. Therefore, as in FIG. 2B, the lower half of the H-bridge circuit comprised of the third and fourth transistors 14 and 16 is decoupled from the motor 18.

To drive the motor 18 in a direction which is the reverse of that shown in FIG. 2A, the control voltage applied at terminal 90 is greater than 3.5 volts. Consequently, the output 72 of the first comparator 74 is low. This causes the first transistor 10 to become substantially non-conducting, whereas the third transistor 14 has its base 52 forward biased due to the first inverter 66. The control voltage at terminal 90 of greater than 3.5 volts causes the voltage at output 80 of the second comparator 82 to be high. This results in the base 50 of the second transistor 12 to be forward biased and in the fourth transistor 16 to be substantially non-conducting due to the second inverter 70. So, the drive current of the motor flows from the high potential terminal 24, through the second transistor 12, through a sensing resistor 57, from the second terminal 38 of the motor 18 to its first terminal 32, through the third transistor 14, and finally to the low potential terminal 30.

In another embodiment the base 48 of the first transistor 10 is biased during the brake mode of FIG. 2B, such that the first transistor 10 is rendered substantially nonconducting. Similarly, in the reverse direction brake mode, the second transistor 12 may be either forward biased or not, since the first high side clamp diode 58 bypasses, the second transistor 12 during the reverse direction brake mode.

In another embodiment of the invention, driving a motor 18 is accomplished as in FIG. 2A by biasing the first and fourth transistors 10, 16 such that they are conducting and biasing the second and third transistors 12 and 14 such that they are substantially nonconducting. However, unlike in FIG. 2B, braking of the motor 18 is accomplished by mirror image biasing of the first, second, third, and fourth transistors 10, 12, 14, and 16. Specifically, that is achieved by rendering conducting the second and third transistors 12 and 14 and by rendering substantially nonconducting the first and fourth transistors 10, 16. As a result of these steps, the motor current 55, during braking of the motor, will flow from the high potential terminal 24 through the second transistor 12, through the sensing resistor 57, through the motor 18, through the third transistor 14 to the low potential terminal 30. No negative voltages are generated at the terminal 56 or at the terminal 62. This embodiment obviates the need for the steps of coupling a first and a second high side clamp diodes 58, 60 from the second 38 and first 32 terminals of motor 18, respectively, to the high potential terminal 24. After the motor 18 has stopped, the first, second, third, and fourth transistors 10, 12, 14, and 16, are brought into a high impedance state, that is they are rendered substantially nonconducting. This is done to prevent supplying current for driving the motor 18 in the reverse direction. Therefore, the motor 18 is stopped efficiently, since substantially neither it nor the transistors 10, 12, 14, and 16 are consuming power. Alternatively, preventing the motor 18 from rotating after it has stopped can be done by biasing the transistors 10, 12, 14, and 16 into a low or a high side brake mode, as discussed above. In either of these modes, the power consumption is relatively small, since the motor 18 is stopped.

In another embodiment of the invention, an apparatus comprises an H-bridge circuit and a first and second high side clamp diodes 58 and 60, as illustrated in FIG. 2A, as well as a junction isolated circuit coupled to terminal 56, wherein the junction isolated circuit is a commutation pulse sensing circuit which only intermittently senses commutation pulses, when the voltage at terminal 56 is negative.

Having thus described exemplary embodiments of the present invention, it should be understood by those skilled in the art that the above disclosures are exemplary only and that various other alternatives, adaptations and modifications may be made within the scope of the present invention.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A method for elimination of motor negative voltages and sensing positive braking during braking of a motor, having a first and a second terminals, by use of a high and a low potential terminals, wherein, in a drive mode, current is driven from the first terminal to the second terminal of the motor, the method comprising the steps of:

coupling the second terminal of the motor to the high potential terminal;

coupling a diode from the first terminal of the motor to the high potential terminal, the diode being connected such that the diode's forward current is from the first terminal of the motor to the high potential terminal; and coupling a commutation pulse sensing circuit employing junction isolation technology to one of the first and second motor terminals.

2. The method as recited in claim 1, wherein the step of coupling the second terminal of the motor to the high potential terminal comprises the steps of:

coupling a first switch between the second terminal of the motor and the high potential terminal;

switching the first switch into a first state, such that a current can flow between the high potential terminal and the second terminal of the motor.

3. The method as recited in claim 2, wherein the step of switching the first switch comprises switching a first switch in an H-bridge circuit, further comprising the steps of:

coupling a second switch in an H-bridge circuit between the second terminal of the motor and the low potential terminal;

switching the second switch into a second state for decoupling the second terminal of the motor from the low potential terminal;

coupling a third switch in an H-bridge circuit between the first terminal of the motor and the low potential terminal;

switching the third switch into a second state for decoupling the first terminal of the motor from the low potential terminal.

4. The method as recited in claim 3, wherein the step of switching the first switch into the first state comprises the step of biasing a first transistor into conduction.

5. The method as recited in claim 3, wherein the steps of switching the second and third switches into the second state comprises the steps of:

biasing a second transistor to substantially prevent it from conducting; and biasing a third transistor to substantially prevent it from conducting.

6. A method as recited in claim 2, wherein the step of coupling the first switch comprises the steps of coupling a first terminal of the first switch to the high potential terminal and coupling a second terminal of the first switch to a first terminal of a resistor, further comprising the step of coupling a second terminal of the resistor to the second terminal of the motor.

7. The method as recited in claim 1, further comprising the step of driving the motor by:

decoupling the second terminal of the motor from the high potential terminal;

coupling the first terminal of the motor to the high potential terminal;

decoupling the first terminal of the motor from the low potential terminal; and coupling the second terminal of the motor to the low potential terminal.

8. The method as recited in claim 1, wherein the step of coupling the second terminal of the motor to the high potential terminal comprises the step of using a control circuit.

9. The method as recited in claim 1, wherein the step of coupling a commutation pulse sensing circuit comprises coupling the commutation pulse sensing circuit to the second terminal of the motor.

10. The method as recited in claim 1, wherein the step of coupling a commutation pulse sensing circuit comprises coupling the commutation pulse sensing circuit to the first terminal of the motor.

11. A method for elimination of motor negative voltages and sensing positive braking during braking of a motor having a first and a second terminals by use of a high and a low potential terminals, wherein, in a drive mode, current is driven from the second terminal to the first terminal of the motor, the method comprising the steps of:

coupling the first terminal of the motor to the high potential terminal;

coupling a diode from the second terminal of the motor to the high potential terminal, the diode being connected such that the diode's forward current is from the second terminal of the motor to the high potential terminal; and coupling a commutation pulse sensing circuit employing junction isolation technology to one of the first and second motor terminals.

12. An apparatus for sensing commutation pulses by elimination of motor negative voltages during braking of a motor having a first and a second terminals by use of a high and a low potential terminals, wherein, in a drive mode, current is driven from the first terminal to the second terminal of the motor, the apparatus comprising:

a first diode coupled between the first terminal of the motor and the high potential terminal, the diode being capable of carrying a forward current and being connected such that the diode's forward current is from the first terminal of the motor to the high potential terminal;

a first switch coupled between the second terminal of the motor and the high potential terminal, the first switch being switchable between the first and second states:

a commutation pulse sensing circuit using junction isolated technology coupled to the second terminal of the motor, the commutation pulse sensing circuit being substantially incapable of tolerating negative voltages.

13. The apparatus as recited in claim 12, wherein the first switch comprises a control port for switching the first switch between the first and second states, further comprising a control circuit coupled to the control port of the first switch.

14. The apparatus as recited in claim 12, further comprising an H-bridge circuit, wherein the first switch comprises a first switch in the H-bridge circuit, the H-bridge circuit comprising:

a second switch coupled between the second terminal of the motor and the low potential terminal, the second switch being switchable between a first and a second states;

a third switch coupled between the first terminal of the motor and the low potential terminal, the third switch being switchable between a first and a second states.

15. The apparatus as recited in claim 12, further comprising:

a second diode coupled between the second terminal of the motor and the high potential terminal, the diode being capable of carrying a forward current and being connected such that the diode's forward current is from the second terminal of the motor to the high potential terminal;

a fourth switch coupled between the first terminal of the motor and the high potential terminal, the fourth switch being switchable between a first and a second states.

16. The apparatus as recited in claim 12, further comprising a sensing resistor coupled between the second terminal of the motor and the commutation pulse sensing circuit.

* * * * *